United States Patent
Bergelt et al.

(10) Patent No.: US 8,257,173 B2
(45) Date of Patent: Sep. 4, 2012

(54) SYSTEM AND METHOD FOR DRIVING ARTIFICIAL INTELLIGENCE (AI) CHARACTERS HAVING CONTINUOUS REEVALUATION OF CURRENT GOALS AND NAVIGATION PATH

(75) Inventors: Anthony Bergelt, Coquitlam (CA); David Smith, Vancouver (CA); Josh C Brown, Vancouver (CA); Darius Julian Tam, Vancouver (CA); Ian D. Yip, Burnaby (CA); Vince Jewlal, Vancouver (CA)

(73) Assignee: Disney Enterprises, Inc., Burbank, CA (US)

( * ) Notice: Subject to any disclaimer, the term of this patent is extended or adjusted under 35 U.S.C. 154(b) by 1011 days.

(21) Appl. No.: 12/236,457

(22) Filed: Sep. 23, 2008

(65) Prior Publication Data
US 2009/0197686 A1 Aug. 6, 2009

Related U.S. Application Data

(60) Provisional application No. 61/026,418, filed on Feb. 5, 2008.

(51) Int. Cl.
*A63F 9/24* (2006.01)
*G01C 21/30* (2006.01)
(52) U.S. Cl. .......... 463/31; 463/30; 463/43; 463/1; 345/473; 345/474; 701/400; 701/301
(58) Field of Classification Search .......... 463/30, 463/31, 32, 33, 1; 273/308; 345/473, 474; 701/209
See application file for complete search history.

(56) References Cited

U.S. PATENT DOCUMENTS

| | | | | |
|---|---|---|---|---|
| 6,961,055 | B2 * | 11/2005 | Doak et al. | 345/419 |
| 7,833,096 | B2 * | 11/2010 | Sakaguchi et al. | 463/31 |
| 2002/0154174 | A1 * | 10/2002 | Redlich et al. | 345/848 |
| 2003/0058238 | A1 * | 3/2003 | Doak et al. | 345/419 |
| 2006/0293839 | A1 * | 12/2006 | Stankieiwcz et al. | 701/200 |
| 2007/0198178 | A1 * | 8/2007 | Trimby et al. | 701/209 |

OTHER PUBLICATIONS

Barbara Yersin, et al.; Steering a Virtual Crowd Based on a Semantically Augmented Navigation Graph; VRLAB; Switzerland, (2005).
Julien Pettré, et al.; A Navigation Graph for Real-Time Crowd Animation on Multilayered and Uneven Terrain; EPFL—VRlab; Switzerland, RIA—LAAS/CNRS; France, (2006).
Julien Pettré, et al.; Planning Human Walk in Virtual Environments; LAAS/CNRS; France, (2002).
Julien Pettré, et al.; Real-Time Navigating Crowds: Scalable Simulation and Rendering; Computer Animation and Virtual Words 2006; 17: 445-455; www.interscience.wiley.com; DOI:10.1002/cav.147.

(Continued)

*Primary Examiner* — David L Lewis
*Assistant Examiner* — Chase Leichliter
(74) *Attorney, Agent, or Firm* — Pillsbury Winthrop Shaw Pittman LLP (57) ABSTRACT

A method for driving an artificial intelligence (AI) character involving computing a navigational graph for a virtual environment and moving the AI character along a current path for an AI character from a current location to a current destination is disclosed. While moving the AI character along the current path the potential alternative destinations are continuously evaluated and a new destination or the current destination based upon a heuristic analysis of the alternative destinations and the current destination. The system also continuously determines whether the AI character can leave the current path.

15 Claims, 7 Drawing Sheets

OTHER PUBLICATIONS

Claudia Esteves, et al.; Animation Planning for Virtual Characters Cooperation; Laboratoire d'Analyse et d'Architecture des Systèms, Toulouse, France, (2006).

Julien Pettré, et al.; A 2-Stages Locomotion Planner for Digital Actors; Eurographis/SIGGRAPH Symposium on Computer Animation (2003).

* cited by examiner

SYSTEM AND METHOD FOR DRIVING ARTIFICIAL INTELLIGENCE (AI) CHARACTERS HAVING CONTINUOUS REEVALUATION OF CURRENT GOALS AND NAVIGATION PATH

CROSS-REFERENCE TO RELATED APPLICATIONS

The present application claims priority under 35 U.S.C. §119(e) to U.S. Provisional Application 61/026,418, filed on Feb. 5, 2008, and which is incorporated by reference in its entirety.

BACKGROUND

1. Field of the Invention

The present application relates, in general, to computer animation and, more particularly, to computer automation of providing convincing behavior for artificial intelligence (AI) characters in a computer game.

2. Description of the Related Technology

Animation systems present animated characters and objects in a three-dimensional virtual space. The virtual space is essentially a collection of mathematical models that define various objects, characters, scenery elements and the like that can interact with each other. The animated characters move by programmatic changes in various parameters of the mathematical models. The virtual space is rendered and presented on a display to a viewer or game player. It is desirable for characters to show awareness of other characters and objects in the virtual space. This is particularly difficult to implement for artificial intelligence (AI) characters that are partially or completely controlled algorithmically rather than by user input. AI characters will often have the ability to look at things, aim at things, and attack things in the three dimensional virtual space.

Artificial intelligence refers to techniques used in video games to produce the illusion of intelligence in the behavior of non-player characters (NPCs). AI encompasses a wide range of techniques from such fields as expert systems, finite state machines, rules-based production systems, decision trees, case-based reasoning, genetic algorithms, neural networks, fuzzy logic and the like. In general, any logic that is used to make a non-player character behave in a way that is responsive to game state, other characters and objects, and/or events in a game in a manner that enhances an illusion that the NPC is driven by intelligence can be considered artificial intelligence.

In conventional implementations, AI characters are programmed to move from one point to another in a game space, usually following a pre-defined path. Once the AI character reaches a predefined goal it will evaluate what its next goal is based upon the heuristics that drive the AI decision making. While conventional AI characters exhibit some degree of independence, the rigid path following and inability to continuously respond to changing game state and/or events can make the AI character's behavior predictable and non-intelligent. This is more apparent as a game or scene is played repeatedly and an AI character behaves the same way each time.

SUMMARY OF CERTAIN INVENTIVE ASPECTS

In some aspects, it is a goal to enable an AI character to exhibit convincing, non-programmatic behaviors based on the current state of a game and events in the game.

One aspect is a method of moving a computer animated character in a virtual environment, comprising, determining a goal for the character to reach, evaluating a first position of the character with respect to a navigational graph and a virtual environment, determining at least one potential route from the plurality of paths, selecting a route from the at least one potential route, and moving the character toward the goal, comprising, searching for shortcuts off the navigational graph, and moving the character along the shortcut if a shortcut is found.

Another aspect is a system for displaying realistic characters in a virtual environment, comprising, a display, a storage, wherein the storage contains game data, a processor comprising an artificial intelligence control system and a game control system, wherein the game control system is configured to generate a virtual environment based on the stored game data, and wherein the game control system is further configured to generate a navigational graph based on the stored game data, and wherein the game control system is further configured to generate a non-player character based on the stored game data, and wherein the artificial intelligence control system is configured to move the non-player character along the navigational graph, and wherein the artificial intelligence control system is configured to move the non-player character off of the navigational graph when a shortcut is available.

Yet another aspect is a method of driving an artificial intelligence (AI)-controlled character comprising, providing a navigational graph for a virtual environment, moving the AI-controlled character along a selected route from a current location toward a node on the selected route, and while moving the AI character along the current path, evaluating potential alternative destinations, and selecting a new destination or the current destination based upon a heuristic analysis of the alternative destinations and the current destination, and determining whether the AI character can leave the current route.

Yet a further aspect is a device for controlling characters in a video game comprising, goal determination means for determining the goal of a character in a video game, position evaluation means for evaluating the position of the character, route determination means for determining a route in a navigational graph for the character to reach the goal, means for determining a second route toward the goal comprising at least one path off of the navigational graph, and means for moving the character along the second route.

DETAILED DESCRIPTION OF CERTAIN INVENTIVE EMBODIMENTS

Artificial intelligence techniques for creating realistic and dynamically changing behavior for AI characters will now be described in conjunction with certain inventive embodiments. These techniques are particularly useful for artificial intelligence (AI) characters (also known as "non-player characters" or "NPCs") in a game in which the techniques allow an AI character to respond to events and objects (e.g., other characters and objects) as game conditions change. Various embodiments may also be useful in non-gaming applications such as animated films and animation research. Some embodiments are described in conjunction with an animated combat game. However, it should be apparent that these and other embodiments can be useful for simulating the behavior of any animated character, whether two-dimensional or three-dimensional, and for use in other contexts, for example, in sports or athletic events.

Many embodiments can be implemented on any general purpose or special purpose computer system providing user interface, control, animation and display functions, or portions thereof. Examples of such systems include general purpose computers such as personal computers, workstations, handheld computers, personal digital assistants and the like; and special purpose computers such as game consoles, handheld computing devices, cell phones, arcade games, simulators, and the like. Such systems can be standalone or networked. Various hardware architectures such as multiprocessing, distributed processing, dedicated logic, and the like, can be used. Various software approaches can be employed including compiled or interpreted code, firmware, microcode, and the like. Functions of many embodiments can be performed in hardware or software to meet the needs of a particular application.

Figure 1:
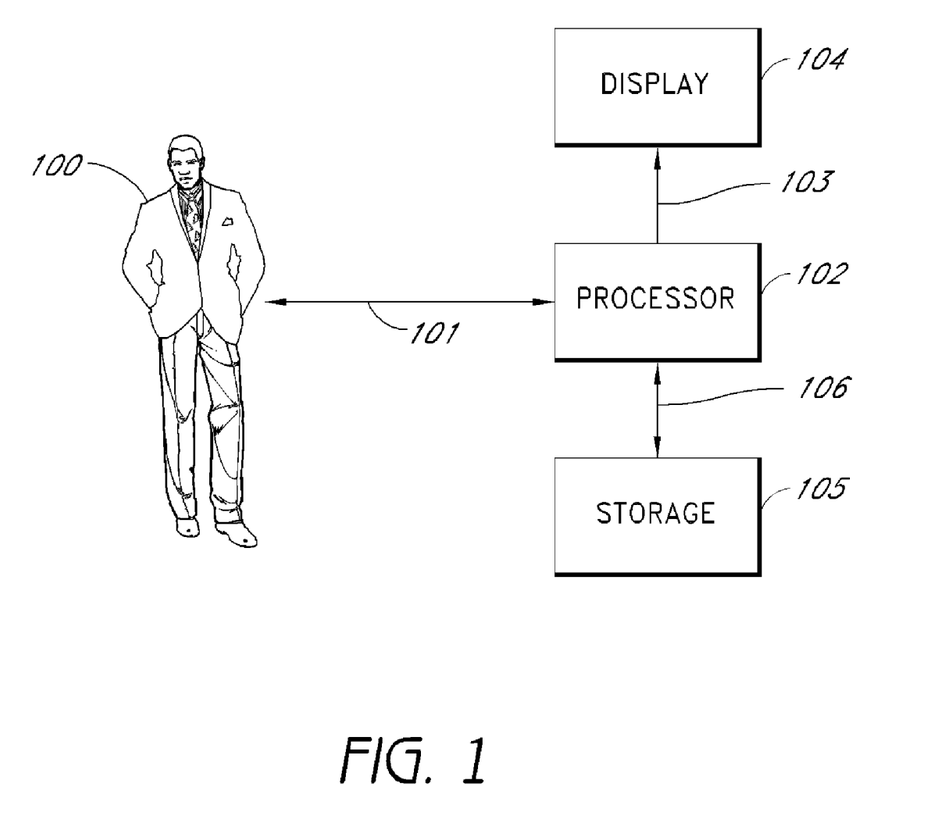
FIG. 1 is a block diagram of a computing environment that may be used in conjunction with inventive embodiments.

FIG. 1 is a block diagram of a computing environment that may be used in conjunction with inventive embodiments. In some embodiments, a user (also referred to as a player) 100 interacts via an interface 101 with a processor 102. The processor 102, is configured to send a display signal 103 to a display 104, for viewing by the user 100 and/or other people. The processor 102 is configured to take instructions and/or other data from a storage 105, that may be pre-configured to contain animation sequences or other data representative of possible states of an animation. The storage is configured to communicate with the processor over a bi-directional data path 106.

Figure 2:
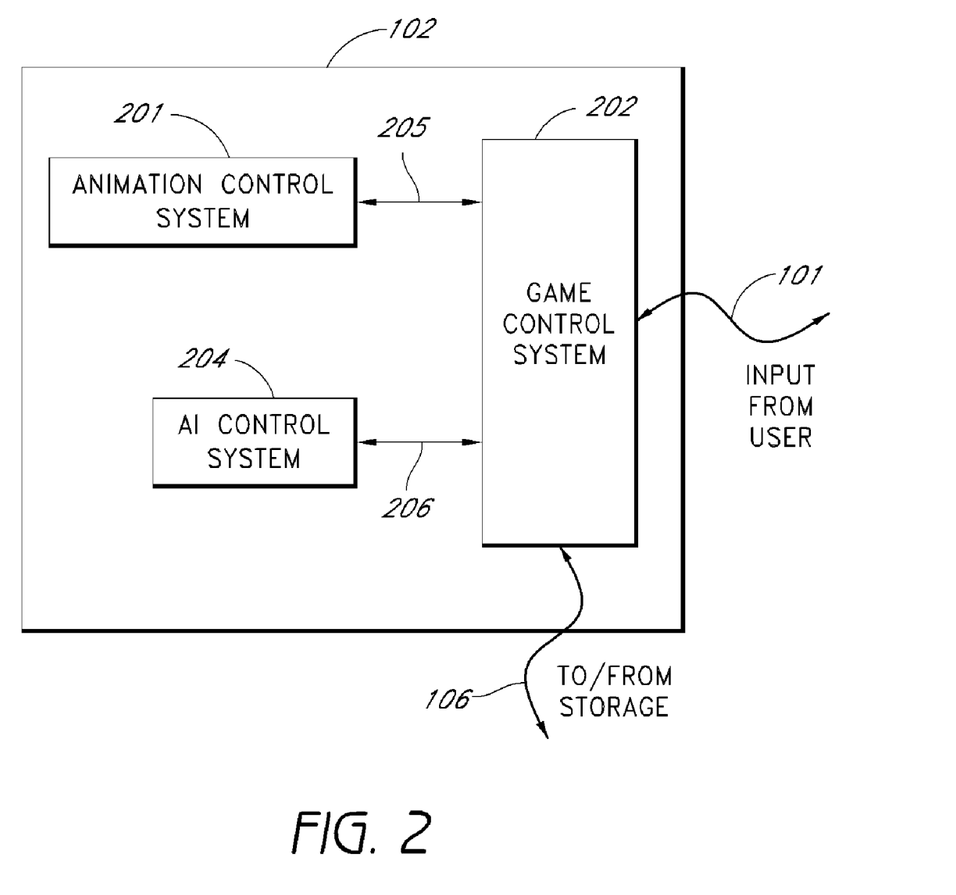
FIG. 2 is a block diagram of the processor of FIG. 1 according to one embodiment.

FIG. 2 is a block diagram of the processor of FIG. 1 according to one embodiment. The interface 101, communicates with a game control system 202. In some embodiments, the game control system 202 communicates over the data path 106, to receive needed information from the storage 105. The game control system 202 may be configured to run the logic of a video game according to instructions stored on the storage 105. In some embodiments, the video game includes instructions for creating a three-dimensional environment and for populating that environment with player-controlled and AI-controlled characters. As the game progresses, the player 100 may watch the game on the display 104, and use the interface 101 to command the game control system 202 as to how the player's character should respond within the game. The game control system 202 communicates with an animation control system 204, over an animation interface 205, so that the animation system can provide animation instructions back to the game control system 202 or to another part of the processor 102. An artificial intelligence (AI) control system 204 monitors the location of characters under AI control via an AI interface 206 and provides the game control system 202 with information on how the AI characters should act within the game. The game control system 202 communicates with the animation control system 204 over the animation interface 205, as with player-controlled characters.

Figure 3:
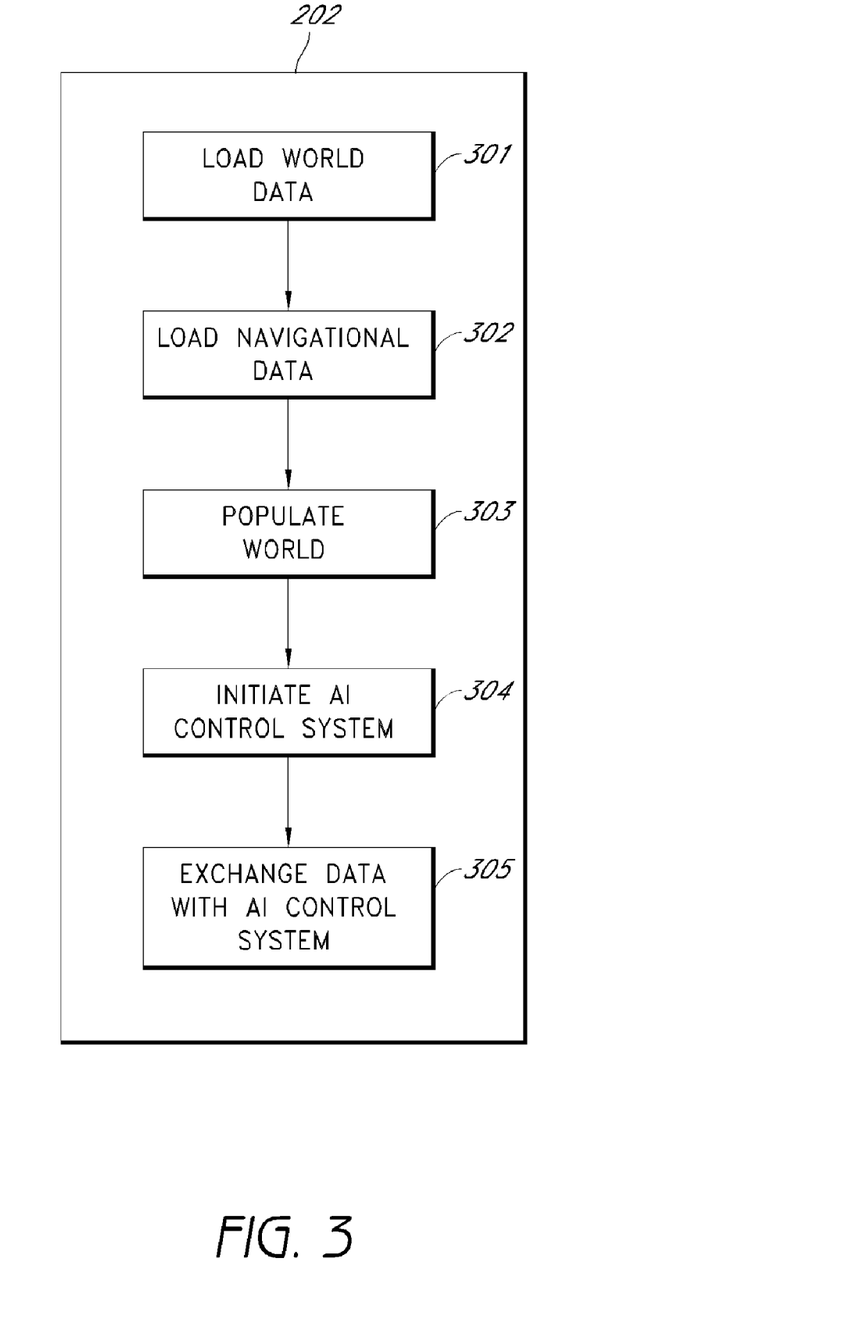
FIG. 3 is a flowchart of the game control system beginning a game according to one embodiment.

FIG. 3 is a flowchart of the game control system beginning a game according to one embodiment. In this embodiment, world data is loaded into active memory at 301. Such world data may be stored on a storage 105 and loaded into the game control system across a data path 106. The world data may contain information related to the appearance and topography of a 3-dimensional virtual space (also referred to herein as the "world"). For instance, the world data may include computer models of objects, textures to apply to those models, and topography data for the terrain in the virtual space.

In addition to loading the world data, the game control system may load navigational data at 302. The navigational data includes a navigational graph, which comprises a graph of nodes (also known as "navigation points") and paths (also known as "edges"). The navigational graph is associated with the virtual space, so that nodes define locations within the space and paths define travel vectors between the nodes. In some embodiments, the nodes are located at character-accessible locations (i.e., locations in the virtual space in which a player can stand without collision with the terrain or static objects in the space), and each path is located on an accessible corridor of travel between two nodes.

In some embodiments, a single navigational graph may be used for all of the characters. Alternatively, navigational graphs may be implemented for each AI-controlled character and world in the game. In some embodiments, the navigational graph includes a significant portion of the navigable areas in the game (i.e., areas that are obstacle free and have terrain that can be traversed by the character). A character can move anywhere within the navigational graph and traverse a defined portion of the world by traveling from a node across edges to other connected nodes and edges. In various embodiments, the navigational graph may be more or less detailed, depending on the design goals of the game. For instance, it may be preferable in some embodiments to have a very sparse navigational graph, with nodes and edges only at key locations within the world. This can decrease development time by reducing the need for a programmer to create a detailed graph. In other embodiments, it may be desired to have a very detailed graph, to reduce runtime computations necessary to find accessible locations off of the navigational graph. In embodiments in which characters move off of the navigational graph to take shortcuts (as described below) it may be desirable to have characters augment the navigational graph in real time, by adding new nodes and edges (e.g., reflecting paths actually explored or anchors, as are described below, found) as the characters move through the world.

The game control system may also populate the virtual space with characters at 303. These characters may be computer-controlled, or player controlled, in accordance with the design of the game. For each character that is to be computer-controlled, the game control system may invoke the AI control system at 304. Thereafter, the AI control system may direct the movements and behaviors of the computer controlled systems. The game control system may exchange data with the initiated AI control system at 305 to coordinate the characters with other aspects of the game.

Figure 4:
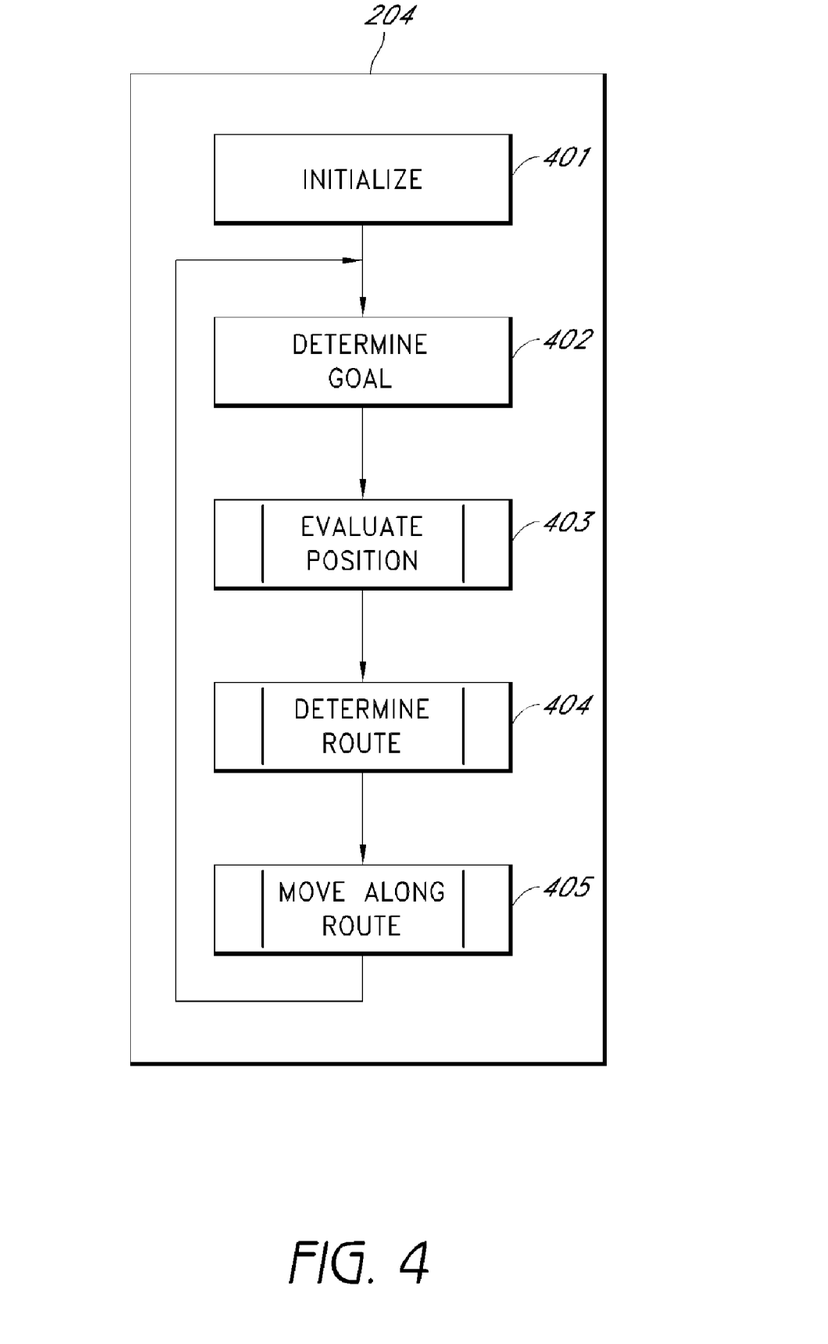
FIG. 4 is a flowchart of the AI control system dynamically moving an AI-controlled character through a game according one embodiment.

FIG. 4 is a flowchart of the AI control system dynamically moving an AI-controlled character through a game according one embodiment. When the game control system invokes the AI control system at 304, the AI control system will initialize at 401. The initialization process allows the AI control system to account for each of the characters under its control, and to load into active memory the location and identity of each of those characters. For each character, the AI control system begins an iterative loop during which it controls the character.

In some cycles of the iterative loop (as used herein, the term "in some cycles" can include "in every cycle", "in no cycle", or "in arbitrary cycles"), the AI control system determines a goal for the current AI-controlled character (as used herein, the term "goal" may refer to one or more goals without loss of generality). The goal will be determined in accordance with information known to the character. Such information may include, for example: information stored in memory and associated with the character as "character memory"); information visible to the character (that is, visual, audio, or other sensory information present in the world in a location that may be perceived by the character given its programmed sensory limits); information known to the AI control system (for instance, the current goals of other characters may be used so that multiple characters do not aim at the same final location); and any other such game information. The AI control system will interpret such character-known information in accordance with heuristics associated with character so as to determine the character's next goal.

In some cycles the AI control system will also evaluate the character's position at 403, as described below with respect to FIG. 5. Further, the AI control system may determine a route for the character at 404 in some cycles. Finally, in some cycles, the AI control system will move the character along a route at 405.

Figure 5:
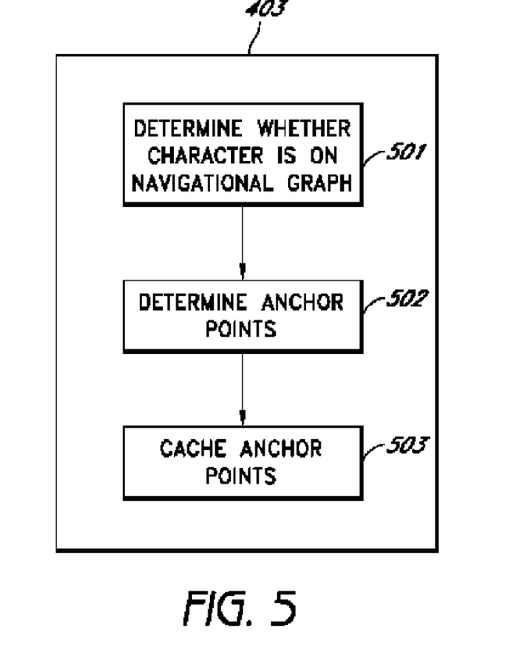
FIG. 5 shows a detailed view of the evaluate position process of FIG. 4.

FIG. 5 shows a detailed view of the evaluate position process 403 of FIG. 4. In order for the AI control system to make a decision, it is helpful to know the character's position in relation to the navigational graph. To that end, during the evaluate position process 403, the AI control system determines whether the location of the non-player character coincides with any node or edge of the navigational graph at 501. That determination may be captured in memory for use in other decision-making steps. Once a character is located, the nearest accessible nodes to the character, also called anchors, are located. In various embodiments, anchors will be deemed the nearest to a character based on various heuristics. For instance, in some embodiments, nearest may mean the closest in travel time, the nearest in straight-line distance, or the nearest in that the fewest obstacles separate the character from the node. In some embodiments, the anchors may be accessible edges or portions of edges as well as accessible nodes. These anchors, once identified, are then stored, or cached, into memory at 503 for potential use at a later time.

In some embodiments, it is useful to always have one or more known anchor points associated with a character, because it allows the characters to get "lost" without losing the ability to move back to the navigational graph. This ability to get lost, allows the characters, as described below, a level of flexibility and dynamic motion that would not be otherwise possible.

Figure 6:
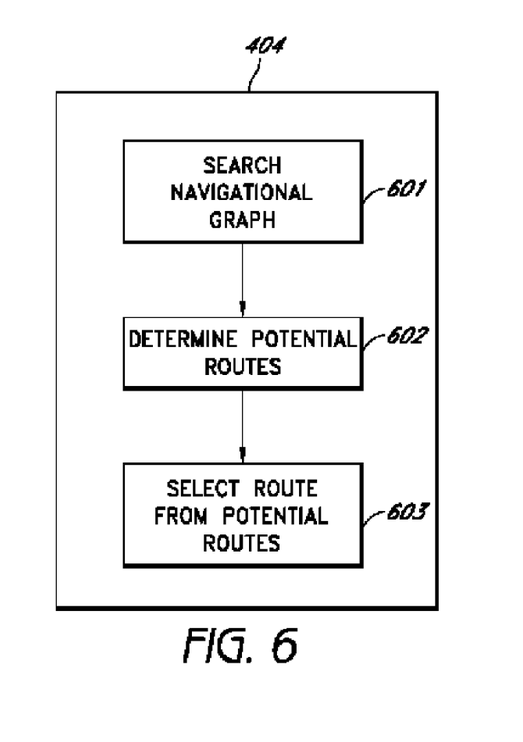
FIG. 6 shows a detailed view of the determine route process of FIG. 4.

FIG. 6 shows a detailed view of the determine route process 404 of FIG. 4. The AI-controlled character has a goal, as selected above, and often must move in the world to reach that goal. In order to move realistically and efficiently it is useful to search the navigational graph at 601 for a cost-effective route to the goal.

Any suitable type of search may be used for this task. However, A* and breadth first searches have certain benefits for use in this context. An A* search is a best-first, graph search algorithm that finds the least-cost path from a given initial node to one goal node (out of one or more possible goals). The A* search uses, for example, a distance-plus-cost heuristic function to determine the order in which the search visits nodes in a tree. For A* searches, the AI character searches for the path of least cost between itself and its destination. The cost of the path is based on a heuristic which weights each navigation node in the graph based on the state of the game level including such parameters as combat danger, proximity to other characters, the width of the path, and similar considerations. For instance, see *The Art of Computer Programming* by Donald E. Knuth, (2$^{nd}$ Edition), Volume 3, Chapter 6 (ISBN-13 978-0201485417); and *Generalized best-first search strategies and the optimality of A\**, Dechter, Rina, and Judea, Pearl (1985), Journal of the ACM 32 (3): pp. 505-536, each of which is incorporated by reference as if fully set out herein.

For breadth first searches (BFS), the AI character begins an outward search at either the navigation node closest to it or the node closest to its selected destination. A BFS is a graph search algorithm that begins at a root node and explores all the neighboring nodes. For each node, the character explores the adjacent unexplored nodes, continuing to increase the scope of the search in this way, until the character finds a node satisfying the current goal. The nodes evaluated are weighted based on a heuristic function to determine which to use as the destination. BFS is an uninformed search method that aims to expand and examine all nodes of a graph systematically in search of a solution. In some implementations a BFS algorithm exhaustively searches the entire navigational graph without considering the goal. For example, see *The Art of Computer Programming* by Donald E. Knuth, Volume 3, Chapter 6.

Once the AI control system has searched the navigational graph, it is able to determine potential routes to the goal at 602. The potential routes may be analyzed according to the character's goal and a cost/benefit or other analysis may be used to select a route from the potential routes at 603. For example, see *Game Programming Gems* 3, *Tactical Path-Finding with A\**, by William van der Sterren.

Figure 7:
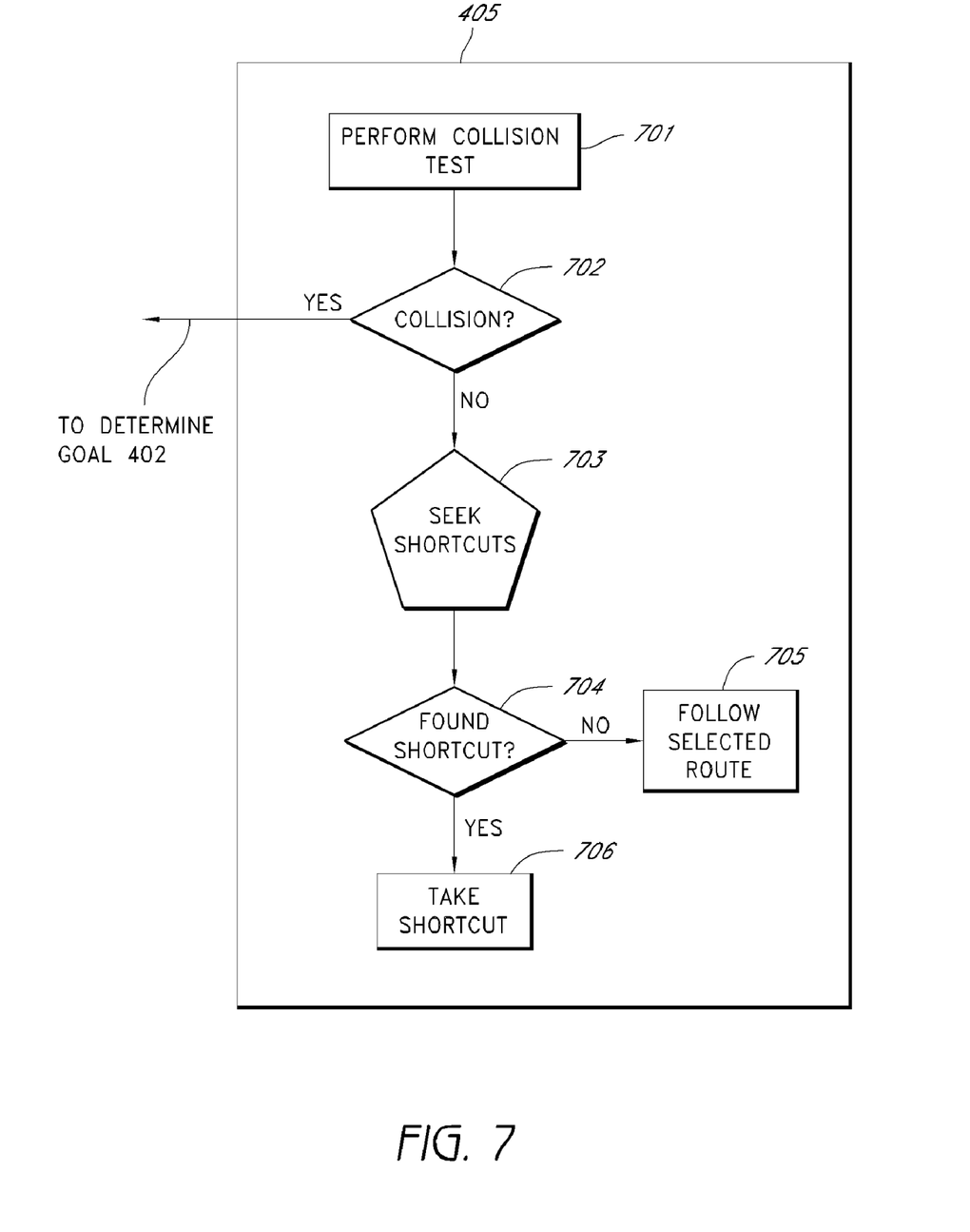
FIG. 7 shows a detailed view of the move along route process of FIG. 4.

FIG. 7 shows a detailed view of the move along route process 405 of FIG. 4. In this process, the AI control system will move the character along the route selected at 603. In some embodiments, the AI control system will perform a collision test at 701 to determine whether the character has collided with any solid body such as an object, a terrain feature, or another character in the world. In some embodiments, the AI control system will designate a cylinder or other geometric hull surrounding the character, and search for any solid bodies within the cylinder.

In some embodiments, the AI control system will test for the intersection of the cylinder with another object in the world's collision octree. An octree is a method of partitioning 3D space into a hierarchy of spaces which can be traversed quickly, each space containing geometry data for that area. In such embodiments, spaces with which the cylinder does not overlap can be discarded before more detailed and time-consuming intersection tests would be performed. For example, see *Game Programming Gems*, by Mark Delgura, pp. 429-443. If an object intersects with the cylinder, a collision has occurred at 702, and the character should be moved back to an unoccupied part of the world. In some embodiments, other suitable methods may be used for detecting collisions. Such collision tests may be used while a character is moving through the world, and may also be used prospectively along potential paths or routes. In the latter case, the tests may be referred to as reachability tests in that they determine whether a chosen target is reachable by the character (i.e., that the character will not encounter a collision in following the route).

In some embodiments, when a collision occurs at 702 the character should not continue along the selected path and a new goal should be determined at 402. In some embodiments, the goal selection algorithm at 402 will weight the collision highly, and select a high-priority goal of returning to the navigational graph, for instance by way of an anchor point. In this way, the character may avoid moving further off of the navigational graph and becoming even more lost.

If there is not a collision, the character should attempt to seek shorter paths off of the navigational graph at 703. In some embodiments, the shortcut search is similar to (or identical to) the anchor point search, in that the AI control system searches for accessible nodes and/or edges proximate to the character. In such embodiments, the proximate nodes and/or edges are compared to nodes and/or edges along the selected route to determine whether the character can move off of the navigational graph directly to a node and/or edge further along on the route than the next node or edge. Such direct paths between the route and a later part of the route may be referred to as shortcuts.

In some embodiments, once an AI-controlled character has found a route to its destination, it will begin to move along the path. As it moves, it will attempt to do a test-walk to each of the nodes along the route. This test-walk is a full test of the cylinder search for any solid bodies within the cylinder, as described previously, from the character's location to the location of the next node. In a test-walk, the AI-controlled character will periodically attempt to walk to the next node on its route until it either reaches the last node, when it will begin again or until it finds a node in the route that it can walk to. Once the character finds such a reachable node, the new path between the character's location and the reachable node is a shortcut. Upon finding a shortcut, the character may, in some embodiments, collapse its route such that the new node at the end of the shortcut is the new beginning of the route. Upon collapsing a route, the character may continue to follow the route or seek further shortcuts in accordance with this strategy. In some embodiments, the character need not even reach the new node before switching to another shortcut. In this way, a character may move through the virtual environment without reaching a node on the navigational graph. Potentially, a character may spend all of its time off of the navigational graph pursuing shortcuts. In some embodiments, a character may also find shortcuts between the character's present location and the character's final target, which may be another character or some other object not constrained to the navigational graph. In such cases, the character may perform periodic collision tests along its intended path to ensure that the target is always reachable. If the target becomes unreachable, it may revert to an anchor or other nearby node to associate itself with the navigational graph before choosing a new route to follow.

In some embodiments the shortcut search involves a breadth-first search or an A* search, but may employ other suitable searching methods. In some embodiments the shortcut search is performed by analyzing the terrain and solid bodies in the world to determine whether a character could walk directly between its current location and a node and/or edge further along the selected route. This test may be performed by use of a geometrical hull collision test, as described above or an often suitable method.

If a viable shortcut is not found at 704, then in some embodiments the AI control system 204 will have the character follow the selected route at 705.

If a shortcut is found at 704, then the system 204 will have the character take the shortcut at 706 in some embodiments. In this case, the character moves off the navigational grid toward the further-along node in the selected route.

To the extent that forms of FIGS. 1-7 imply a specific sequence in which the processes are accomplished, this should only be understood to reflect the sequences of certain embodiments. In some embodiments, the many processes may be implemented in parallel (or in iterative loops of shapes other than those depicted in FIGS. 1-7) and essentially continuously such that goals are continuously being selected at 402, the character is continuously being located at 403 and new routes are continuously being selected at 404. As the AI character moves along the route at 405, it continuously determines whether sections of the path can be skipped at 703 by leaving the direct path between the navigation nodes. By skipping sections of the direct path, the AI characters behave more dynamically since they are not constrained to the direct path connections in cases in which there are no obstacles blocking the characters when they leave the path.

Figure 8:
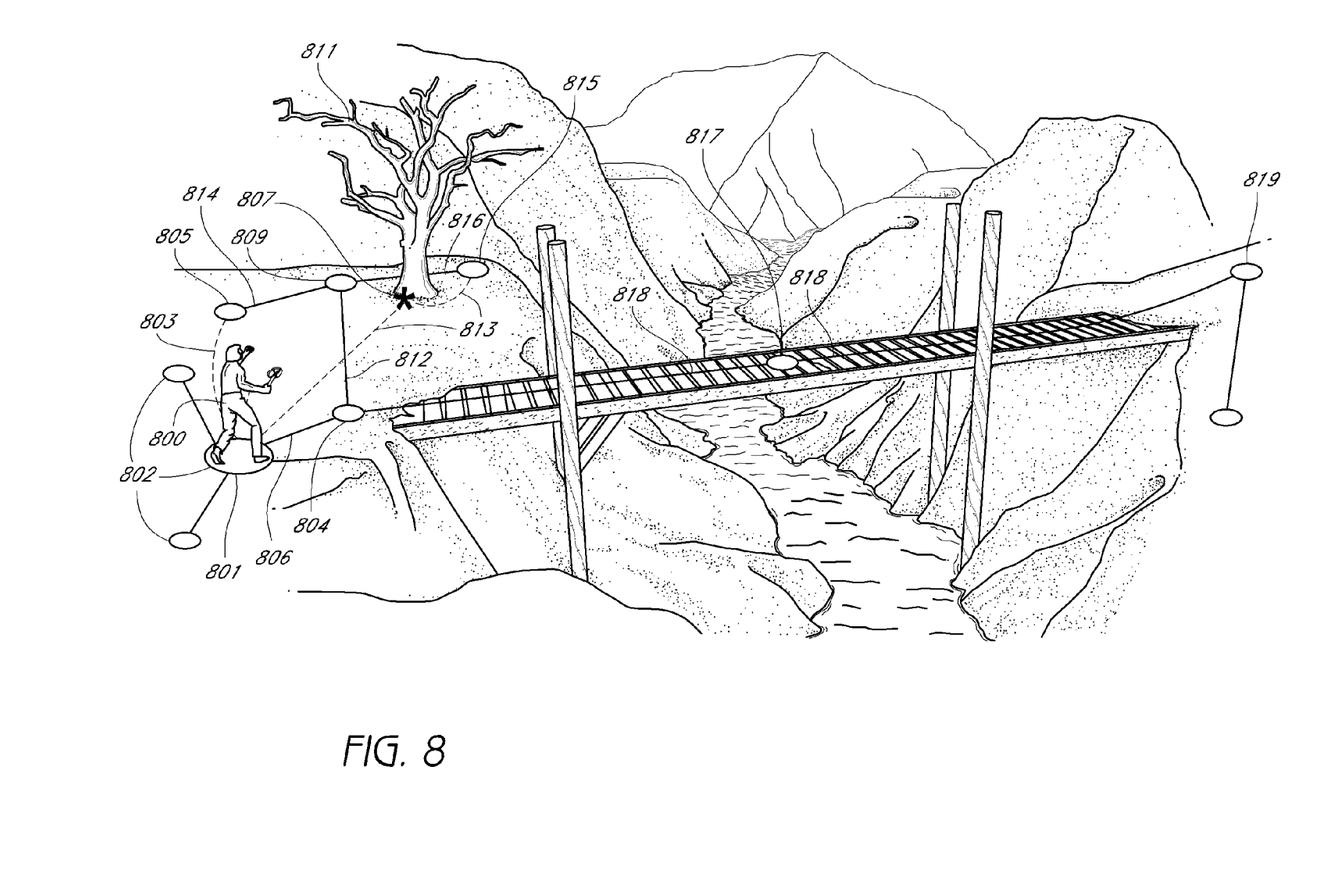
FIG. 8 shows a graphical view of a virtual environment according to one embodiment.

FIG. 8 shows a graphical view of a virtual environment according to one embodiment. In some embodiments, an AI-controlled character 800 begins within the virtual environment at a node 801. As described above, the character 800 may have a route to a current destination. For instance, in FIG. 8, the character 800, which is depicted at node 802, may have node 805 as its current destination, and may have the series of steps, {node 802, edge 806, node 804, edge 812, node 807, edge 814, node 805}, as its route to node 805. As described above, such a character 800 may search for shortcuts from its current location to its current destination. In FIG. 8, the broken line 803 depicts a shortcut from node 802 to node 805. After finding the shortcut, including, performing appropriate collision and/or reachability tests, the character 800 may leave the route and follow shortcut 803 directly to node 805.

Similarly, the character 800 at node 802 may have node 815 as its current destination and may have the series of steps, {node 802, edge 806, node 804, edge 812, node 807, edge 816, node 815}, as its route to node 815. In this case, if the character attempts to perform a search for shortcuts while at node 802, it may find the potential shortcut 813. However, if the character performs a reachability test it will find that the potential path 813 collides with an object 811 at collision point 807. In certain embodiments, this collision would render the potential shortcut 813 unviable, and the character would proceed along its route to 815. In various embodiments, as described previously, the character may continue to search for shortcuts while it travels its route and may eventually find a shorter path to its destination node.

In some embodiments, the character 800 will maintain a list of anchor points, representing a set of nearby and/or accessible nodes to the character. For instance, in FIG. 8 the character 800 has three anchor points 802 associated with it at its current position. From its location, each of the anchor points 802 is accessible, and the character may return to them if it becomes lost from the navigational graph.

In some embodiments, the nodes and/or edges may be a visible part of the virtual environment, while in other embodiments, the nodes and/or edges may be invisible so as not to distract from the realism of the game. In further embodiments, the nodes and/or edges may be optionally visible such that a user or developer may toggle the display of the nodes and/or edges in the virtual environment.

In some embodiments, certain nodes and/or edges of the navigational graph may be marked as "unskippable." Unskippable nodes may not be bypassed in a selected route by a shortcut. Unskippable nodes are useful, for instance, when a terrain feature make shortcuts impractical or undesirable to a game designer. For instance, in FIG. 8, node 817, and edges 818 are on a bridge over a canyon. Such nodes and edges could be made unskippable in some embodiments, so that a character does not move off of the bridge into the canyon in attempt to take a shortcut to a node further along the route, for instance to node 819.

In various embodiments, the AI characters continuously select new goals at 402 and new routes at 404, and may choose a new route at 404 before finishing the current one.

In many embodiments, the dynamic evaluation of goals and routes, coupled with the skipping of sections of the navigation path, enhances the perception by a user of an AI character dynamically moving through a game level in an unconstrained and emergent way.

It is often the case that characters dynamically react to other characters (AI-controlled characters and player-controlled characters), terrain features, and objects within the game. The heuristic functions used for goal determination at 402 and route determination at 404 may, in some embodiments, use heuristics that consider proximity to other characters and level objects. Such functions may be designed to cause the AI characters to spread out from other characters that are not enemies, and close in on characters which are enemies. For instance, in certain games, there may be a tactical advantage to having AI characters approach an enemy character in a fanned-out formation; this behavior could be implemented by having friendly AI characters move away from one another while moving along similar routes. Such heuristic functions may also take into account game level objects which provide combat advantages (e.g., higher ground, cover weapons, energy, or other resources), and cause the AI characters to move closer to those. Conversely, the heuristic functions may consider objects that increase risk or pose threats and motivate an AI character to move away.

In certain embodiments, the continuous evaluation of sections of the AI character's current navigation path that can be skipped and continuous selection of new destinations allow the AI characters dynamically move through the game level. This can cause the AI characters to smoothly move from one destination to another and may create the appearance of emergent behavior.

Although various embodiments have been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

What is claimed is:

1. A computer-implemented method of moving a computer animated character in a virtual environment, the method being implemented in a computer system comprising one or more processors configured to execute computer program modules, the method comprising:

determining a goal location in a virtual environment for a non-player character to move toward from a first position of the non-player character within the virtual environment;

evaluating the first position of the non-player character with respect to the goal location in a navigational graph of the virtual environment to determine at least one potential route through the virtual environment from the first position to the goal location, wherein the navigational graph includes a series of predefined paths between location nodes within the virtual environment, and wherein the one or more routes of the at least one potential routes are formed along the predefined paths in the navigational graph;

selecting a route from the at least one potential route; and moving the non-player character toward the goal location, wherein the moving comprises moving the non-player character along the selected route, concurrent with movement by the non-player character along the selected route, searching for an alternate route to the goal location that are off the navigational graph, and responsive to finding an alternate route to the goal location, controlling the non-player character to move off of the selected route and onto the alternate route.

2. The method of claim 1, wherein the moving the non-player character toward the goal location further comprises determining whether the alternative route has a lower cost than the selected route, and wherein the controlling the non-player character to move off of the selected route and onto the alternate route is further responsive to the alternative route being less costly than the selected route.

3. The method of claim 1, further comprising iteratively determining a goal location for the non-player character as the non-player charter is moving toward the current goal location.

4. The method of claim 1, further comprising performing, in an ongoing manner, two or more of the determining, the evaluating, the selecting, or the moving.

5. The method of claim 4, wherein two or more of the continuously running operation are performed in an ongoing manner at different frequencies.

6. The method of claim 1, further comprising detecting collisions between the character and objects in the virtual environment, and moving the character to an node location on the navigational graph responsive to a collision being detected.

7. The method of claim 1, wherein the moving the non-player character toward the goal location further comprises continuing to move the non-player character toward the goal location responsive to the alternate route being more costly than the selected route.

8. The system of claim 4, wherein the navigational graph comprises at least one node configured to be unskippable by shortcuts.

9. The method of claim 3, wherein the iterative determinations of the goal location is performed based upon a heuristic analysis of alternative goal locations and a current goal location.

10. The method of claim 9 wherein the heuristic analysis of alternative goal locations and the current goal location comprises performing a breadth first search of the location nodes within the navigational graph.

11. The method of claim 9 wherein the heuristic analysis of alternative goal locations and the current goal location comprises a function that causes the non-player character to move away from other characters.

12. The method of claim 9 wherein the heuristic analysis of alternative goal locations and the current goal location comprises a function that causes the non-player character to move towards other characters.

13. The method of claim 9 wherein the heuristic analysis of alternative goal locations and the current goal location comprises a function that causes the non-player character to move towards objects that provide combat advantages.

14. A system for displaying realistic non-player characters in a virtual environment, comprising:

storage, wherein the storage contains game data; and
    a processor configured to execute:
       a game control system configured to generate a virtual environment based on the stored game data, and to obtain a navigational graph from the stored game data, wherein the navigational graph includes a series of predefined paths between location nodes within the virtual environment, and wherein the game control system is further configured to generate a non-player character, based on the stored game data, that is expressed within the virtual environment, and an artificial intelligence control system is configured to:
- determine a goal location in a virtual environment for a non-player character to reach from a first position of the non-player character within the virtual environment;
- evaluate the first position of the non-player character with respect to the goal location in the navigational graph of the virtual environment to determine at least one potential route through the virtual environment from the first position to the goal location, wherein the one or more routes of the at least one potential routes are formed along the predefined paths in the navigational graph;
- select a route from the at least one potential route; and
- move the non-player character toward the goal location, wherein such moving comprises:
    - moving the non-player character along the selected route,
    - concurrent with movement by the non-player character along the selected route, searching for an alternate route to the goal location that are off the navigational graph, and
    - responsive to finding an alternate route to the goal location, controlling the non-player character to move off of the selected route and onto the alternate route.

15. A device for controlling characters in a video game comprising:
- goal determination means for determining a goal location in a virtual environment for a non-player character to move toward from a first position of the non-player character within the virtual environment;
- position evaluation means for evaluating a first position of the non-player character with respect to the goal location in a navigational graph of the virtual environment to determine at least one potential route through the virtual environment from the first position to the goal location, wherein the navigational graph includes a series of predefined paths between location nodes within the virtual environment, and wherein the one or more routes of the at least one potential routes are formed along the predefined paths in the navigational graph;
- means for selecting a route from the at least one potential route; and
- means for moving the non-player character along the selected route, where in the moving comprises
    - moving the non-player character along the selected route,
    - concurrent with movement by the non-player character along the selected route, searching for an alternate route to the goal location that are off the navigational graph, and
    - responsive to finding an alternate route to the goal location, controlling the non-player character to move off of the selected route and onto the alternate route.

* * * * *